United States Patent
Cavacuiti et al.

(10) Patent No.: US 10,591,323 B1
(45) Date of Patent: Mar. 17, 2020

(54) SEALED SENSOR APPARATUS

(71) Applicant: Universal Lighting Technologies, Inc., Madison, AL (US)

(72) Inventors: John Cavacuiti, Burnaby (CA); Rob Mahaffey, Burnaby (CA); Wilson Tse, Burnaby (CA)

(73) Assignee: Universal Lighting Technologies, Inc., Madison, AL (US)

( * ) Notice: Subject to any disclaimer, the term of this patent is extended or adjusted under 35 U.S.C. 154(b) by 561 days.

(21) Appl. No.: 15/284,822

(22) Filed: Oct. 4, 2016

Related U.S. Application Data

(60) Provisional application No. 62/238,427, filed on Oct. 7, 2015.

(51) Int. Cl.
  *G01D 11/24* (2006.01)
  *F16J 15/02* (2006.01)

(52) U.S. Cl.
  CPC .......... *G01D 11/245* (2013.01); *F16J 15/022* (2013.01)

(58) Field of Classification Search
  CPC ........ F21V 31/00; F21V 31/005; F21V 31/03; F21V 31/04; G01D 11/245; G01D 11/24; G01D 11/28; G01D 11/30; F16J 15/022; G01L 19/14
  USPC .................................................. 73/431, 866.5
  See application file for complete search history.

(56) References Cited

U.S. PATENT DOCUMENTS

| | | | | |
|---|---|---|---|---|
| 5,448,587 | A * | 9/1995 | Huang | G02B 6/4204 372/103 |
| 7,239,280 | B2 * | 7/2007 | Kordass | H01Q 1/1214 343/711 |
| 2004/0042779 | A1 * | 3/2004 | Maeda | G08B 13/19626 396/79 |
| 2014/0055014 | A1 * | 2/2014 | Pan | H05K 5/02 312/223.2 |

* cited by examiner

*Primary Examiner* — John Fitzgerald
*Assistant Examiner* — Truong D Phan
(74) *Attorney, Agent, or Firm* — Patterson Intellectual Property Law, P.C.; Gary L. Montle

(57) ABSTRACT

A sealed sensor apparatus for a light fixture includes a housing. The housing has a base portion configured to house circuitry of the sensor apparatus. The housing include an integral cylindrical extension projecting from the base portion. The cylindrical extension has an interior surface defining an interior cavity. The cylindrical extension has an exterior surface radially spaced from the interior surface. A gasket may be received about the exterior surface of the cylindrical extension. A lens may be sealingly mounted to the cylindrical extension.

10 Claims, 16 Drawing Sheets

SEALED SENSOR APPARATUS

CROSS-REFERENCES TO RELATED APPLICATIONS

This application claims benefit of the following patent application(s) which is/are hereby incorporated by reference: U.S. Provisional Patent App. No. 62/238,427 for "Watertight Sensor for Fixture Lighting Control" filed Oct. 7, 2015.

A portion of the disclosure of this patent document contains material that is subject to copyright protection. The copyright owner has no objection to the reproduction of the patent document or the patent disclosure as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not applicable

REFERENCE TO SEQUENCE LISTING OR COMPUTER PROGRAM LISTING APPENDIX

Not applicable

BACKGROUND OF THE INVENTION

The present invention relates generally to sensors installed into a corresponding fixture. More particularly, the present invention pertains to a sensor to be installed into corresponding fixture, such as a lighting fixture, that prevents at least some outside contaminants from entering the fixture.

Sensor sealing housings are known in the art. These housings, however, can be difficult to manufacture. Sensor sealing housings typically require a large number of parts and tools to manufacture. Additionally, these housings can be very difficult to install as they typically require the installer to unscrew/screw caps, make adjustments, and the like in order to properly attach the sensor housing to the associated fixture.

What is needed, therefore, is a sealed sensor apparatus that may be of a simplified construction when compared to typical sensor sealing housings, while still providing at least some prevention of contaminants from entering the associated fixture.

BRIEF SUMMARY OF THE INVENTION

Briefly, the present invention relates in one embodiment to a sealed sensor apparatus. The sealed sensor apparatus includes a housing. The housing may include a base portion configured to house circuitry of the sensor apparatus. The housing may also include an integral cylindrical extension projecting from the base portion. The cylindrical extension has an interior surface defining an interior cavity. The cylindrical extension further includes an exterior surface radially spaced from the interior surface. A gasket may be received about the exterior surface of the cylindrical extension. A lens may be sealingly mounted to the cylindrical extension.

An alternative embodiment may include the lens overmolded in the cylindrical extension.

Still another embodiment includes the base portion defining a cylindrical shoulder. The cylindrical extension may project coaxially from the cylindrical shoulder and include a distal end opposite the cylindrical shoulder.

Yet another embodiment includes at least one retaining tab disposed on the cylindrical extension nearer the distal end than the cylindrical shoulder.

Another embodiment includes the gasket further received about the cylindrical shoulder.

A further embodiment includes the gasket including a radially inward projection adjacent the distal end of the cylindrical extension such that the gasket contacts both the exterior surface and the interior surface of the cylindrical extension.

A further still embodiment includes the gasket further including an outer gasket surface including a mounting groove defined therein.

The present invention also relates, in one embodiment, to a sealed sensor apparatus. The sealed sensor apparatus may include a housing. The housing may include a base portion configured to house circuitry of the sensor apparatus. The housing may also include an integral cylindrical wall projecting from the base portion. The cylindrical wall may include a central axis and a cylinder length defined along the central axis. A gasket may be disposed on the cylindrical wall and may be coextensive with a majority of the cylinder length.

In yet another embodiment, the cylindrical wall further includes a lens end, a base end opposite the lens end, and a housing shoulder nearer the base end than the lens end. The gasket may further include an outwardly projecting gasket shoulder engaging the housing shoulder.

In still another embodiment, the gasket further has an outwardly projecting sealing rib spaced from the outwardly projecting gasket shoulder. The sealing rib and gasket shoulder may define a mounting groove therebetween.

In an even further embodiment, the gasket further extends beyond the housing shoulder toward the base end of the cylindrical wall.

In another embodiment, the gasket further includes an inwardly projecting gasket lens end engages the lens end of the cylindrical wall.

One embodiment includes diametrically opposed mounting protrusions disposed on the cylindrical wall nearer the lens end than the base end.

The present invention also relates, in an embodiment, to a sealed sensor apparatus. The sealed sensor apparatus may include a mounting plate. The sealed sensor apparatus may also include a mounting hole defined in the mounting plate by a hole perimeter surface of the mounting plate. The hole perimeter surface may be parallel to an axis of the mounting hole. The sealed sensor apparatus may further include a housing including a base portion and an integral cylindrical portion extending therefrom. The cylindrical portion may be inserted in the mounting hole. A gasket may be disposed between the cylindrical portion and the hole perimeter surface.

In a further embodiment, the base portion includes a housing shoulder. The gasket may include an outwardly projecting gasket shoulder engaging both the housing shoulder and the mounting plate. The cylindrical portion may extend from the housing shoulder.

In another embodiment, the gasket further includes an outwardly projecting sealing rib spaced from the outwardly projecting gasket shoulder. The outwardly projecting sealing rib and outwardly projecting gasket shoulder may capture the mounting plate therebetween.

In an even further embodiment, the cylindrical portion and the mounting hole are sized such that the gasket forms a water-tight seal between the cylindrical portion and the hole perimeter surface.

In another embodiment, the gasket is resilient and is further disposed between the housing and the mounting plate such that the cylindrical portion and the gasket plug the mounting hole.

A further embodiment includes a lens mounted to the cylindrical portion. The lens may extend in a direction away from the base portion beyond the mounting plate.

Another embodiment includes the lens sealingly mounted to the cylindrical portion.

DETAILED DESCRIPTION OF THE INVENTION

Figure 1:
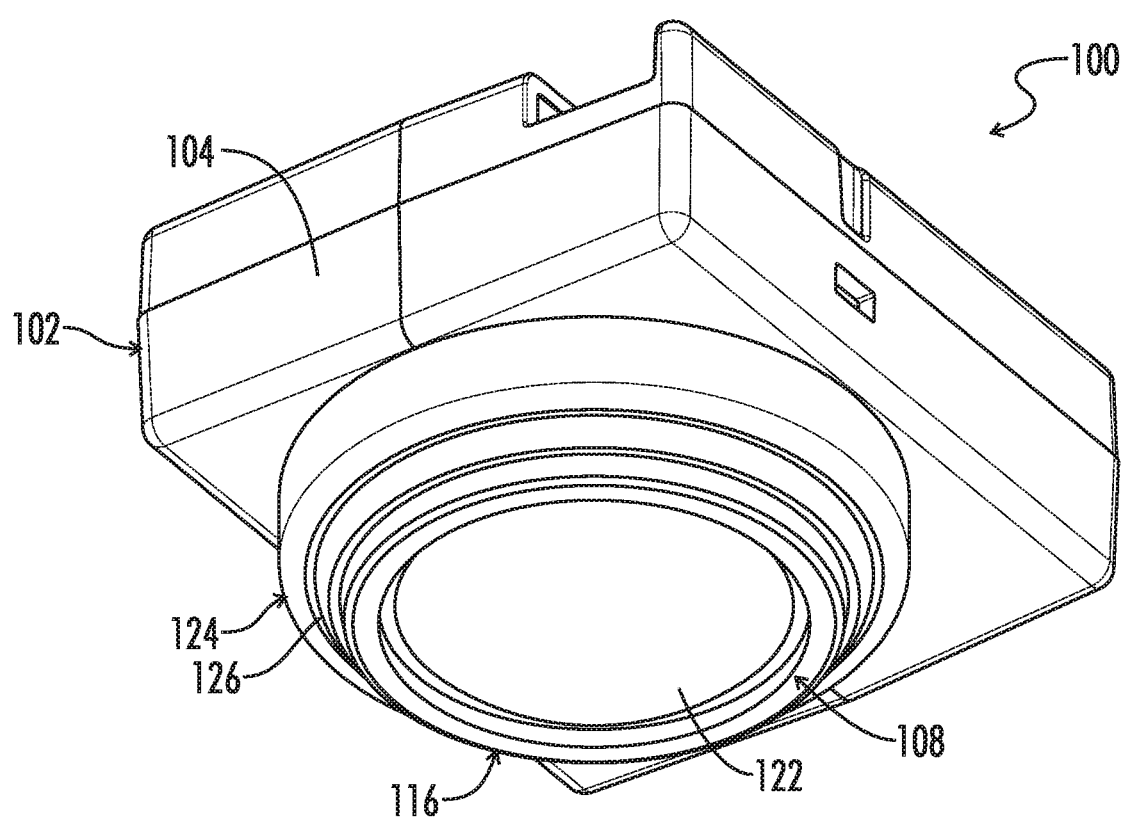
FIG. 1 is a bottom isometric view of one embodiment of a sealed sensor apparatus.
Figure 2:
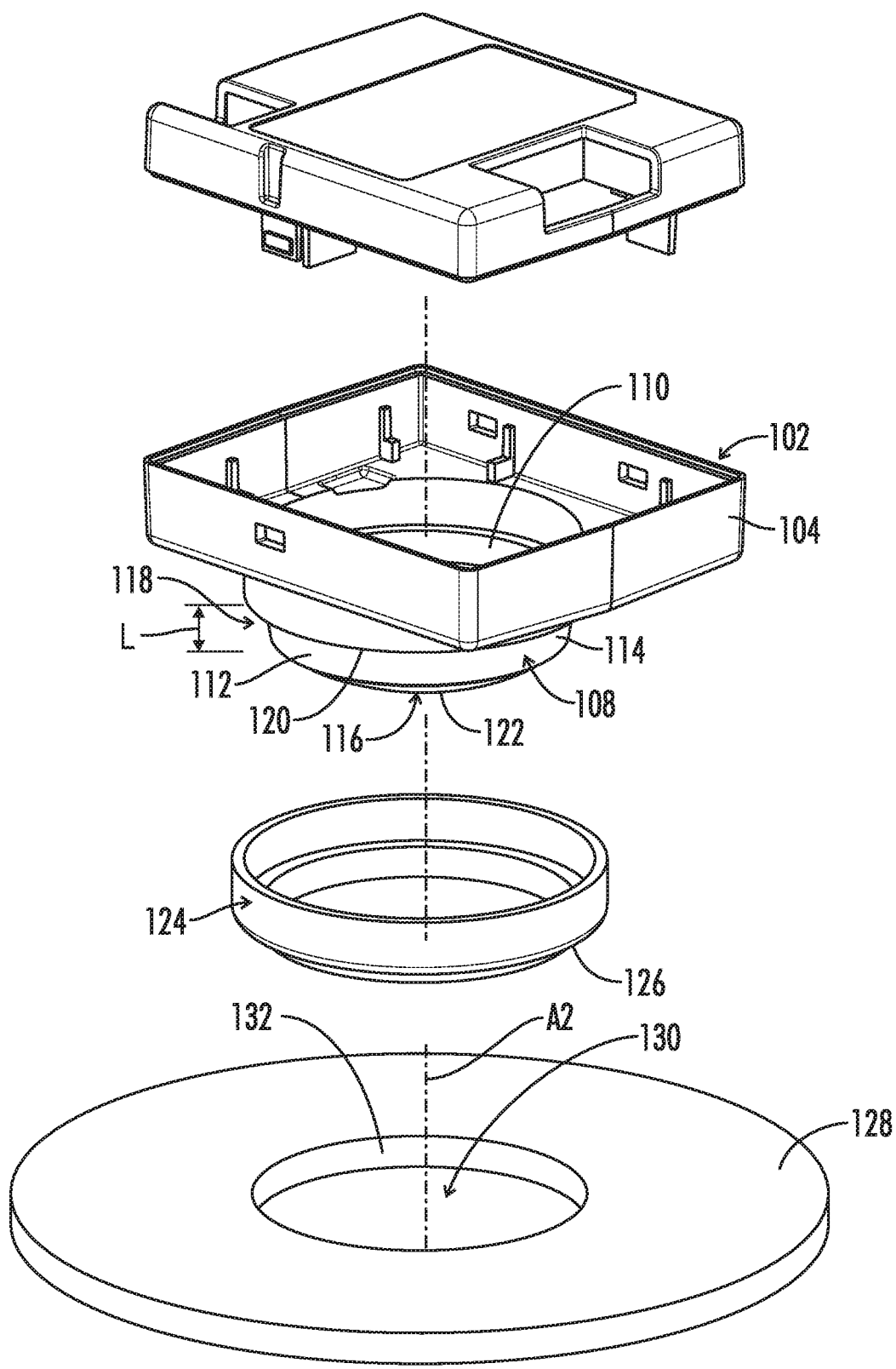
FIG. 2 is a top isometric view of the sealed sensor apparatus of FIG. 1 exploded from a corresponding mounting plate.
Figure 3:
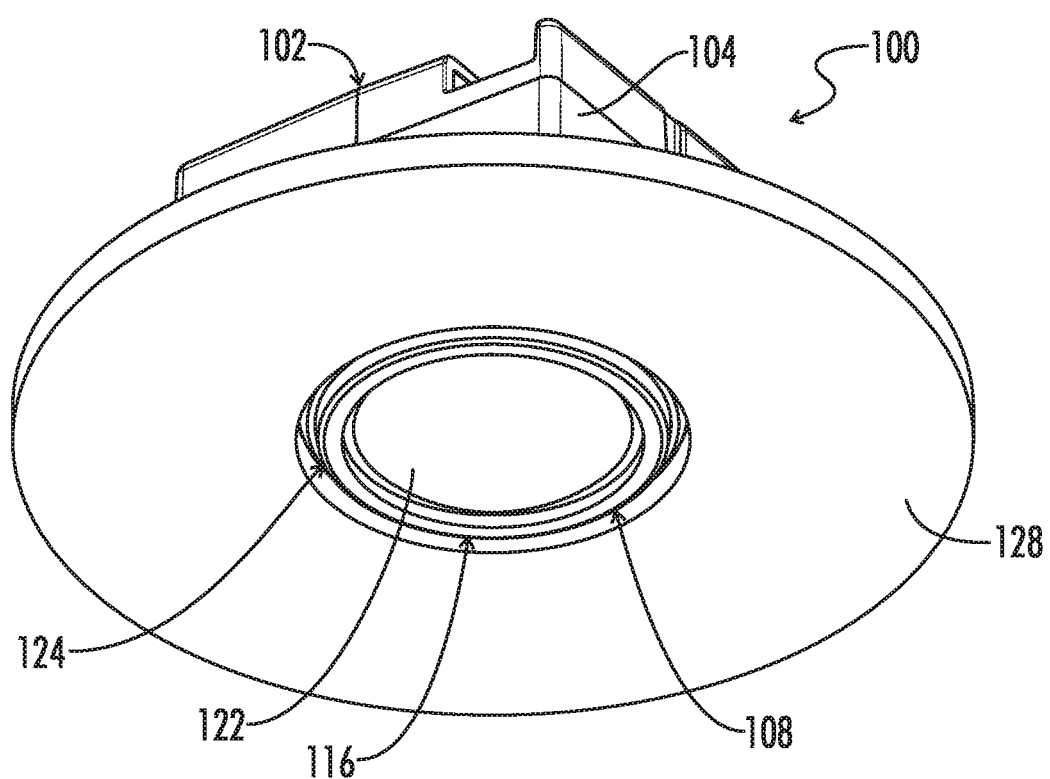
FIG. 3 is a bottom isometric view of the sealed sensor apparatus of FIG. 1 installed in a corresponding hole of the mounting plate.
Figure 4:
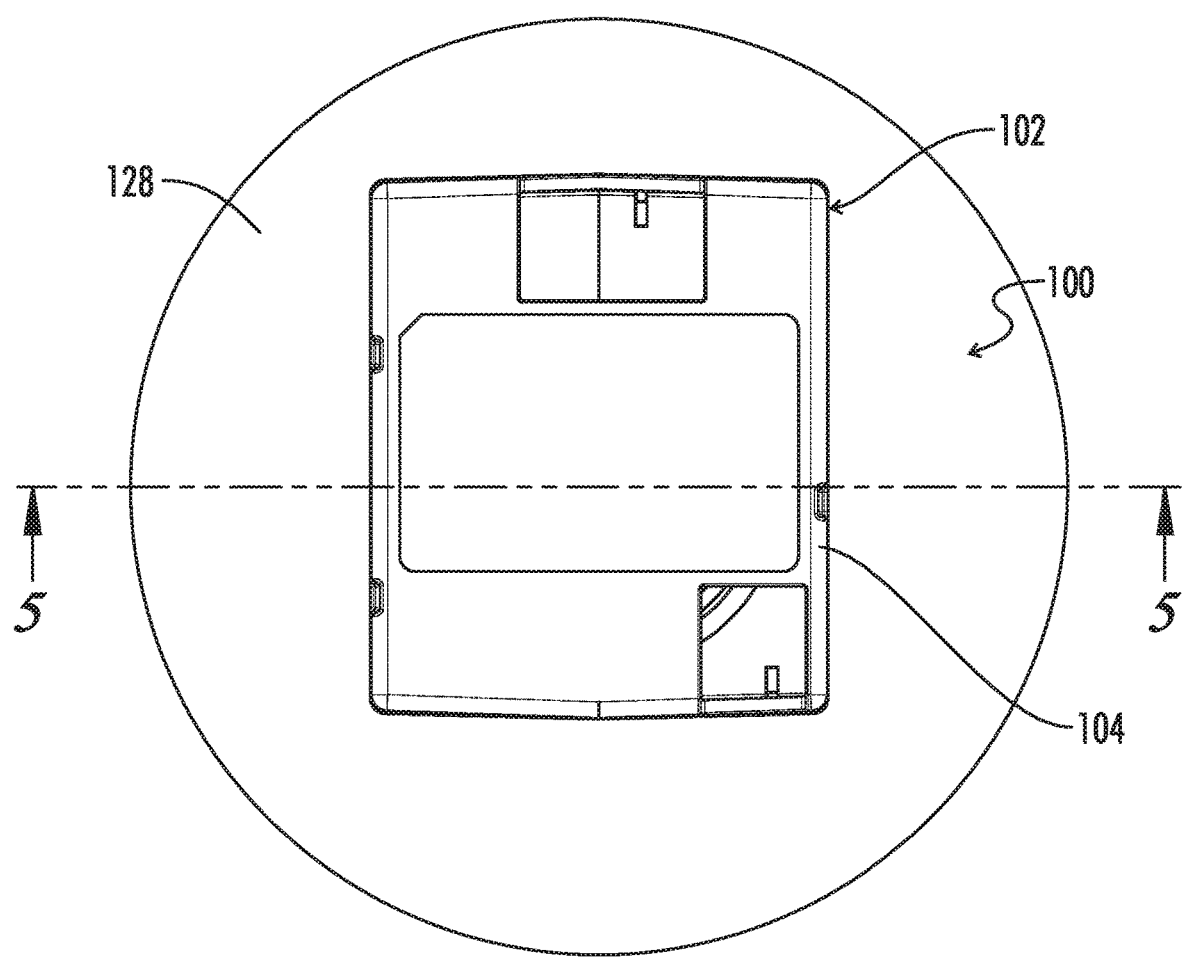
FIG. 4 is a top plan view of the sealed sensor apparatus of FIG. 1 installed in a corresponding hole of the mounting plate.
Figure 5:
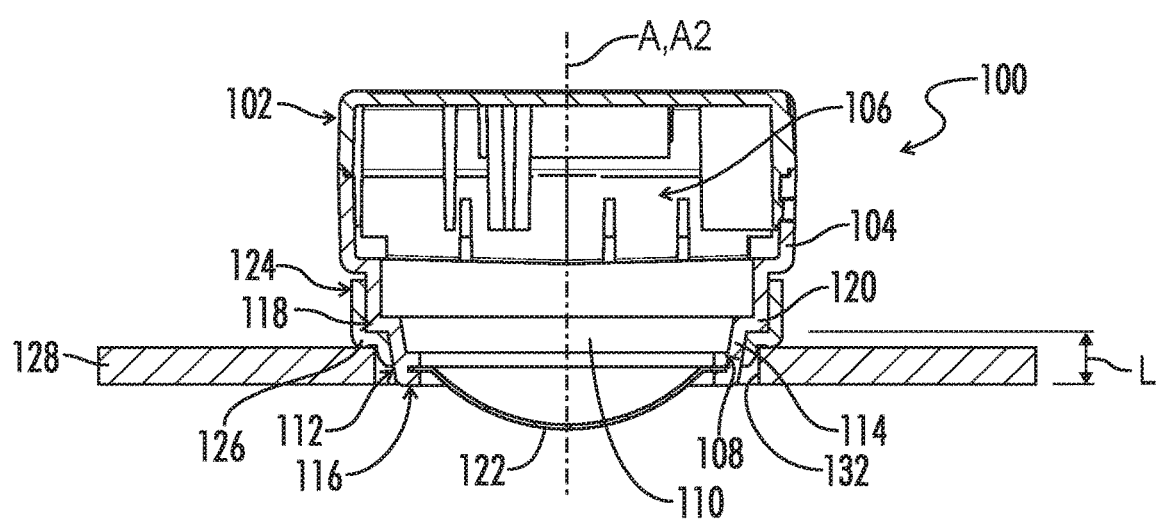
FIG. 5 is a side elevation cross-sectional view of the sealed sensor apparatus of FIG. 1 installed in a corresponding hole of the mounting plate.
Figure 6:
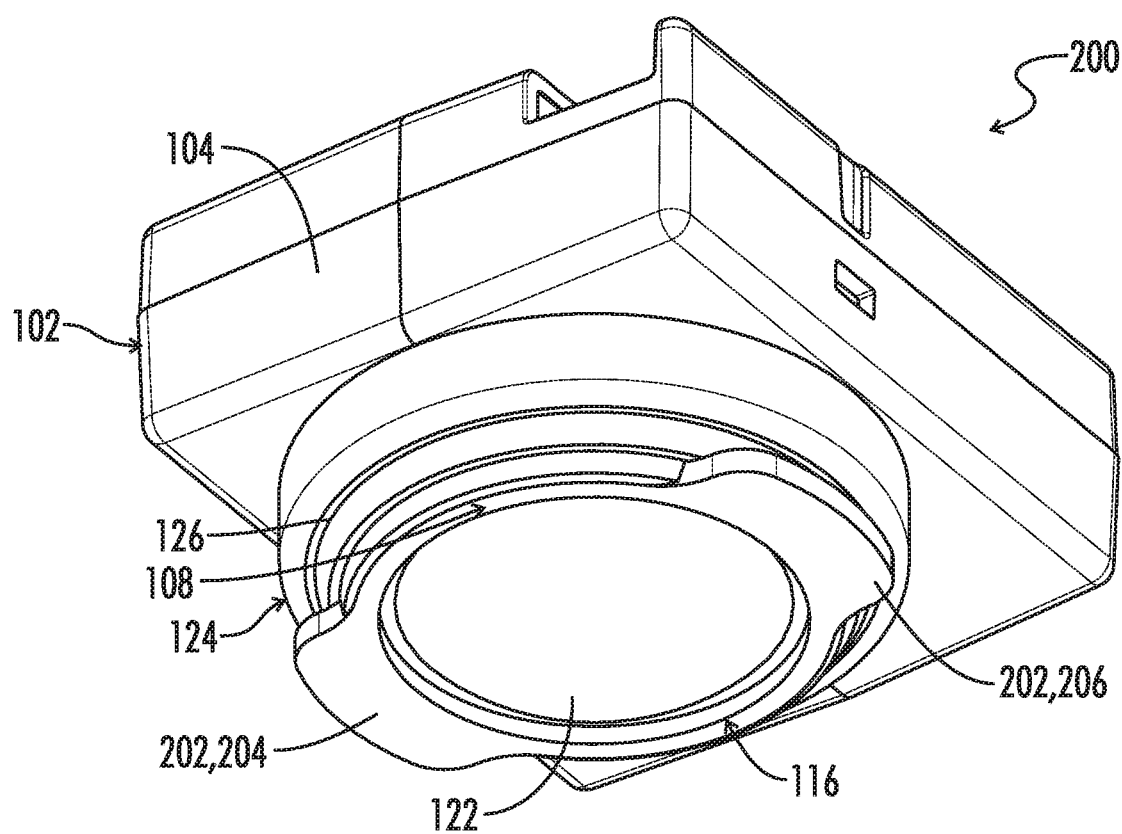
FIG. 6 is a bottom isometric view of another embodiment of a sealed sensor apparatus.
Figure 7:
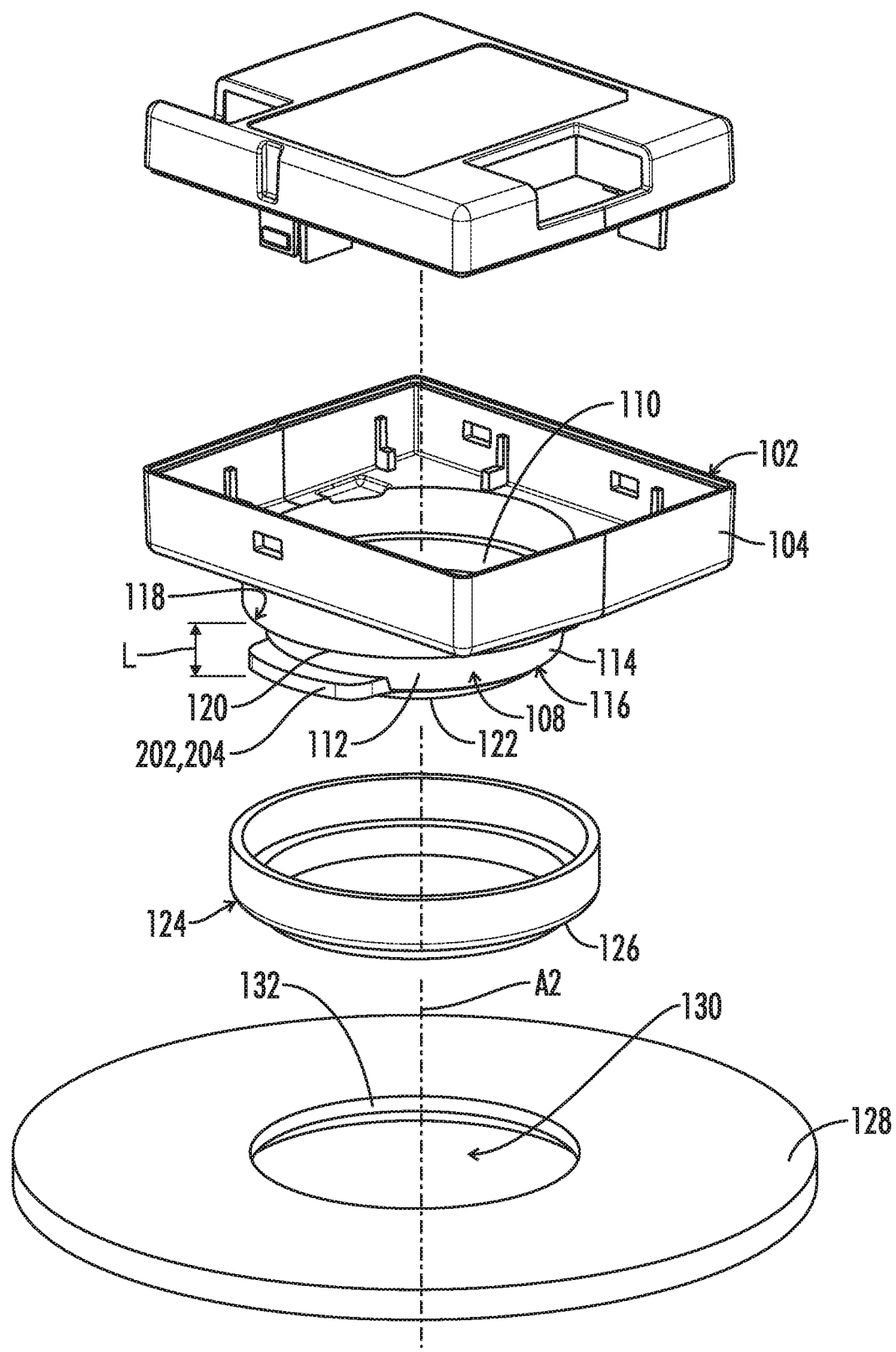
FIG. 7 is a top isometric view of the sealed sensor apparatus of FIG. 6 exploded from a corresponding mounting plate.
Figure 8:
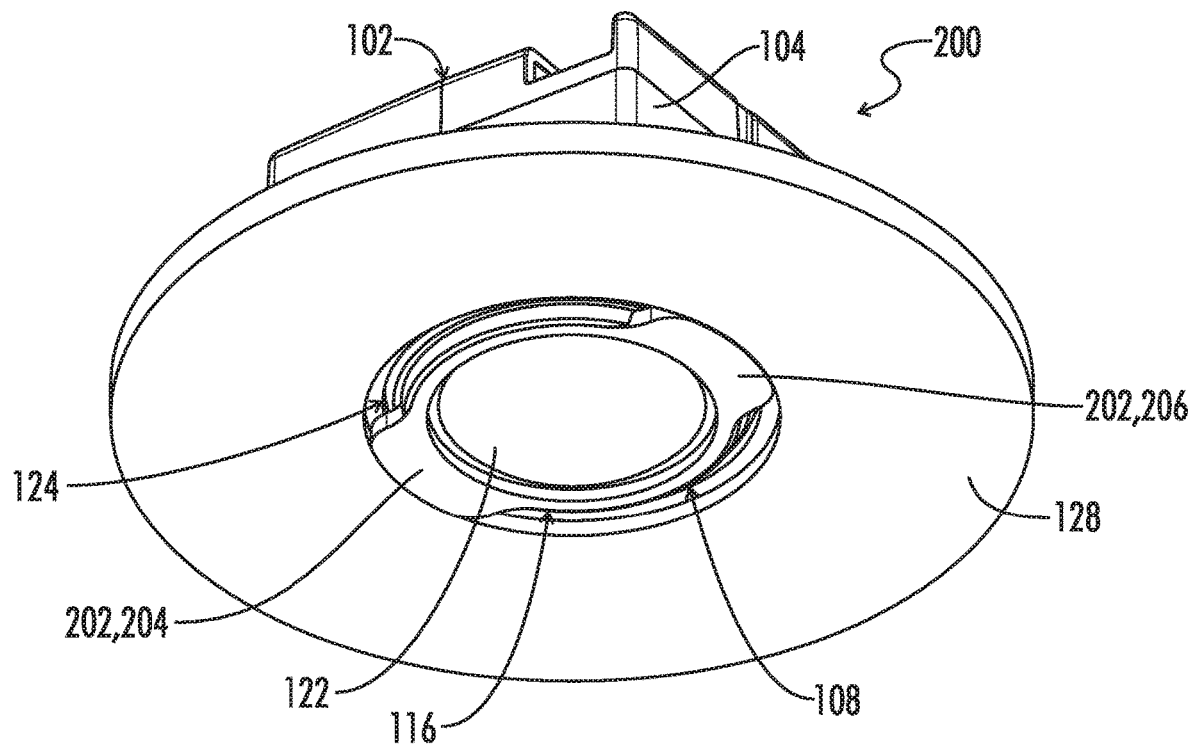
FIG. 8 is a bottom isometric view of the sealed sensor apparatus of FIG. 6 installed in a corresponding hole of the mounting plate.

Reference will now be made in detail to embodiments of the present invention, one or more drawings of which are set forth herein. Each drawing is provided by way of explanation of the present invention and is not a limitation. It will be apparent to those skilled in the art that various modifications and variations can be made to the teachings of the present invention without departing from the scope of the invention. For instance, features illustrated or described as part of one embodiment can be used with another embodiment to yield a still further embodiment.

Thus, it is intended that the present invention covers such modifications and variations as come within the scope of the appended claims and their equivalents. Other objects, features, and aspects of the present invention are disclosed in, or are obvious from, the following detailed description. It is to be understood by one of ordinary skill in the art that the present discussion is a description of exemplary embodiments only and is not intended as limiting the broader aspects of the present invention.

The words "connected", "attached", "joined", "mounted", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; or any combination thereof.

Unless specifically stated otherwise, any part of the apparatus of the present invention may be made of any appropriate or suitable material including, but not limited to, metal, alloy, polymer, polymer mixture, wood, composite, or any combination thereof.

Referring to FIGS. 1-5, a first embodiment of a sealed sensor apparatus 100 is shown. The sealed sensor apparatus 100 may have a housing 102. The housing 102 has a base portion 104. The base portion 104 may be configured to house circuitry 106 of the sensor apparatus 100. An integral extension 108 may project from the base portion 104. In some embodiments, the extension 108 may extend in a direction parallel to an extension axis A of the sensor apparatus 100. The extension 108 may include a cylindrical extension (or cylindrical portion). The cylindrical extension 108 may include an interior surface 110 defining an interior cavity and an exterior surface 112 radially spaced from the interior surface (radially away from the extension axis A).

In an embodiment, the cylindrical extension 108 has an integral cylindrical wall 114 projecting from the base portion 104. The cylindrical wall 114 may have a central axis (collinear with extension axis A in FIG. 1). The cylindrical wall 114 may further have a cylinder length L defined along the central axis A. The cylindrical wall 114 has a lens end (or distal end) 116 and a base end 118 opposite the lens end. The cylinder length L extends from the lens end to the base end. The base portion 104 may further include a housing shoulder (or cylindrical shoulder) 120 located nearer the base end 118 of the cylindrical wall 114 than the lens end 116. In some embodiments, the cylindrical extension 108 may project coaxially from the cylindrical shoulder 120.

A lens 122 may be sealingly mounted to the cylindrical extension 108. In some embodiments, the lens 122 may be overmolded in the cylindrical extension 108. One embodiment may include the lens 122 sealingly mounted to the cylindrical extension 108 along the periphery of the lens, and the center of the lens may project in a direction along the extension axis A beyond the lens end 116 of the cylindrical extension 108.

The sealed sensor apparatus 100 may further include a gasket 124 received about the exterior surface 112 of the cylindrical extension 108. The gasket 124 may also include an outwardly projecting gasket shoulder 126 engaging the housing shoulder (or cylindrical shoulder) 120. The gasket 124 may further extend beyond the housing shoulder 120 away from the lens end 116 of the cylindrical wall 114. In some embodiments, the gasket 124 is further received about the cylindrical shoulder 120. The gasket 124, disposed on the cylindrical wall 114, may be coextensive with a majority of the cylinder length L.

The sealed sensor apparatus 100 may be affixed to a mounting plate 128. The mounting plate 128 may have a mounting hole 130 defined therein by a hole perimeter surface 132 of the mounting plate. The hole perimeter surface 132 may be parallel to a mounting hole axis A2. In some embodiments, the mounting hole axis A2 and the extension axis A may be collinear when the sealed sensor apparatus 100 is installed on the mounting plate 128. The cylindrical portion (or cylindrical extension) 108 may be inserted in the mounting hole 130. The gasket 124 may then be disposed between the cylindrical portion 108 and the hole perimeter surface 132. In such embodiments, the outwardly projecting gasket shoulder 126 may engage both the housing shoulder 120 and the mounting plate 128. The cylindrical portion 108 and the mounting hole 130 may be correspondingly sized such that the gasket 124 forms a water-tight seal between the cylindrical portion and the hole perimeter surface 132 when the sealed sensor apparatus 100 is installed on the mounting plate 128. The gasket 124 may be resilient and further disposed between the housing 102 and the mounting plate 128 such that the cylindrical portion 108 and the gasket plug the mounting hole 130. With particular reference to the sealed sensor apparatus 100 of FIGS. 1-4, the cylindrical portion 108 including the gasket 124 disposed thereon may be inserted into the mounting hole 130 much like a drain plug in a drain. Put another way, the cylindrical portion 108 and the gasket 124 disposed thereon may be axially inserted into the mounting hole 130 until a proper water-tight seal is formed between the housing 102 and the mounting plate 128. The housing shoulder 120 may have an outer diameter that is larger than the diameter of the mounting hole 130, such that the housing shoulder and/or a gasket 124 disposed thereon prevents further insertion of the housing 102 into the mounting hole. Once the sensor apparatus 100 is installed in the mounting hole 130, the lens 122 may extend in a direction away from the base portion 104 beyond the mounting plate 128.

Turning now to FIGS. 6-11, a second embodiment of a sealed sensor apparatus 200 is shown. Many portions of the sealed sensor apparatus 200 may be similar to those discussed above, and the corresponding drawing figures may include repeated reference characters previously listed. In the interest of brevity, duplicative description of these above stated features/components/portions have been omitted.

The sealed sensor apparatus 200 may have at least one retaining tab (or mounting protrusion) 202 disposed on the cylindrical extension 108 nearer the distal end 116 than the cylindrical shoulder 120. In some embodiments, the sealed sensor apparatus 200 may include diametrically opposed mounting protrusions 202 disposed on the cylindrical wall 114 nearer the lens end 116 than the base end 118. The mounting protrusion(s) 202 may extend radially outward from the cylindrical wall 114. In such embodiments including one or more mounting protrusions 202, the mounting protrusions may aid in retaining the sealed sensor apparatus 200 on the mounting plate. The gasket 124 may be compressed between the mounting plate and the cylindrical shoulder 120 by a retaining force from the cylindrical shoulder and the mounting protrusion 202. In embodiments including diametrically opposed mounting protrusions 202, the sealed sensor apparatus 200 is first angled such that one of the mounting protrusions may be passed through the mounting hole 130 as shown in FIG. 9.

Figure 9:
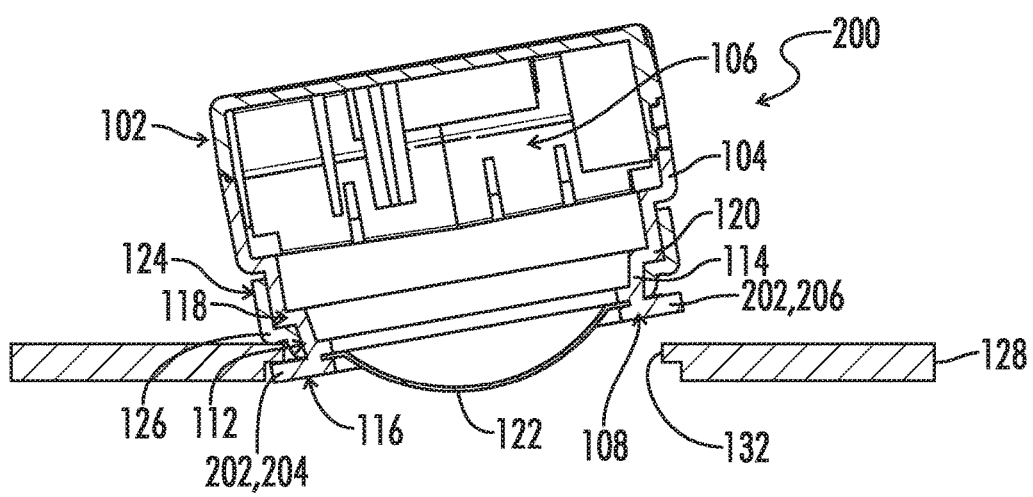
FIG. 9 is a side elevation cross-sectional view of the sealed sensor apparatus of FIG. 6 with one tab of the sealed sensor apparatus inserted in the hole of the mounting plate.
Figure 10:
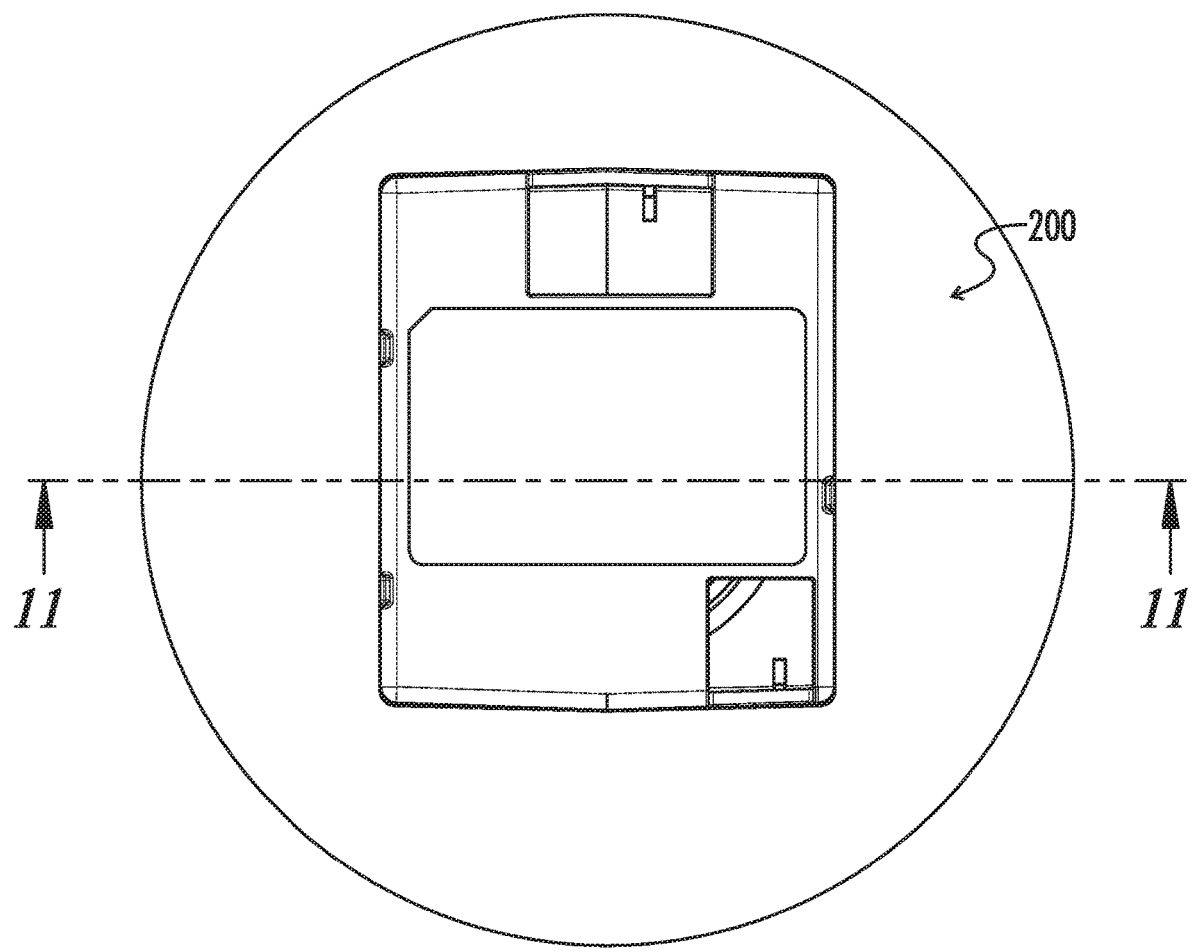
FIG. 10 is a top plan view of the sealed sensor apparatus of FIG. 6 installed in a corresponding hole of the mounting plate.
Figure 11:
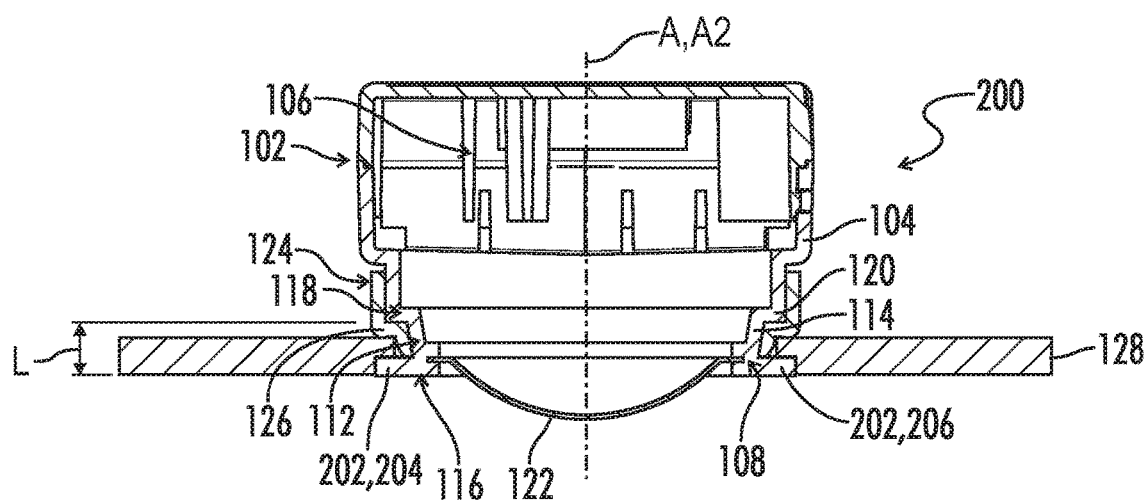
FIG. 11 is a side elevation cross-sectional view of the sealed sensor apparatus of FIG. 6 fully installed in the hole of the mounting plate.
Figure 12:
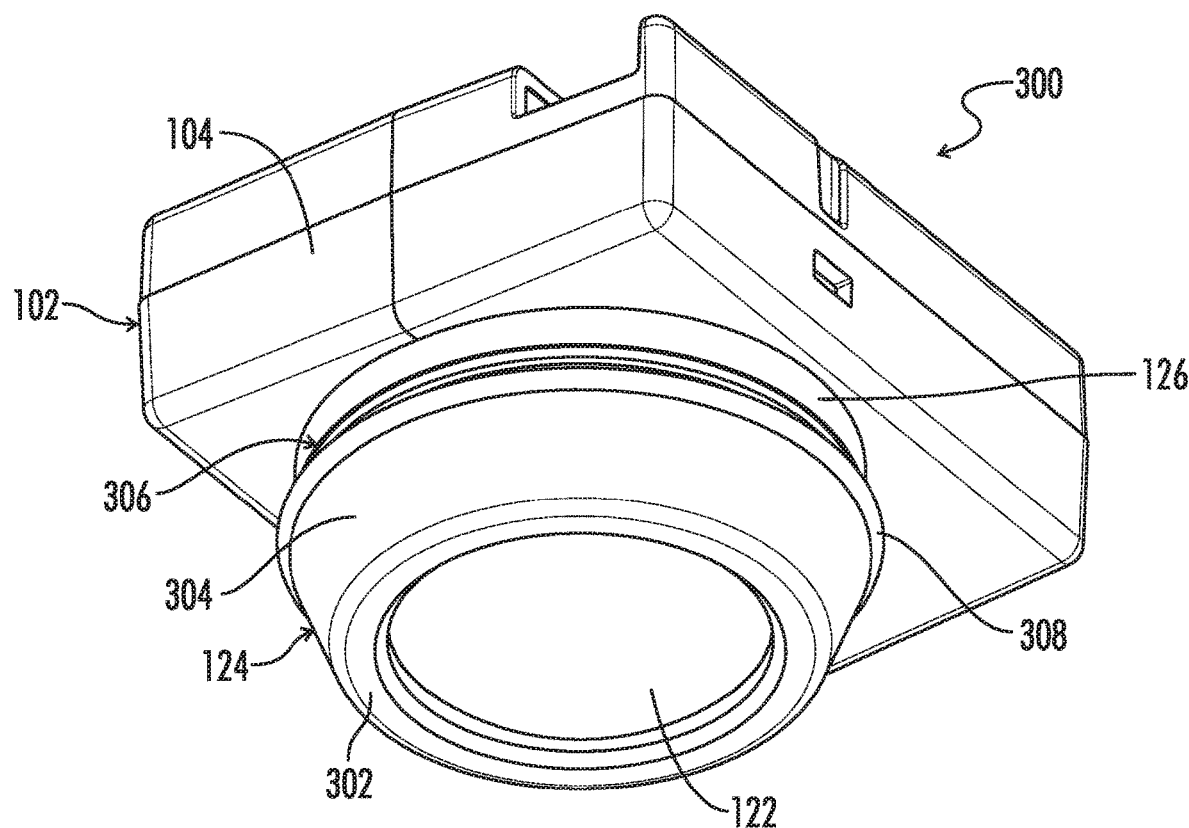
FIG. 12 is a bottom isometric view of yet another embodiment of a sealed sensor apparatus.
Figure 13:
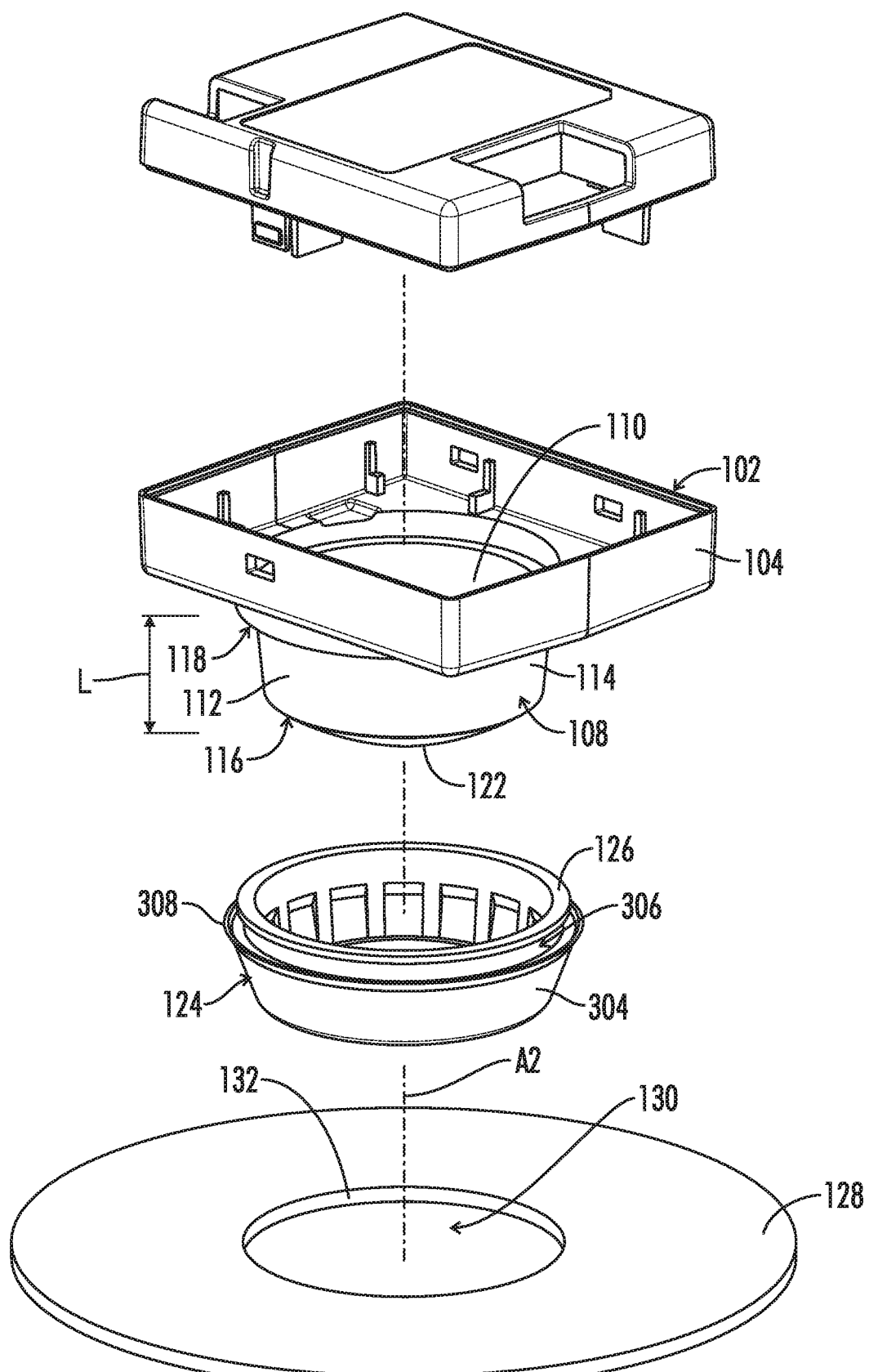
FIG. 13 is a top isometric view of the sealed sensor apparatus of FIG. 12 exploded from a corresponding mounting plate.
Figure 14:
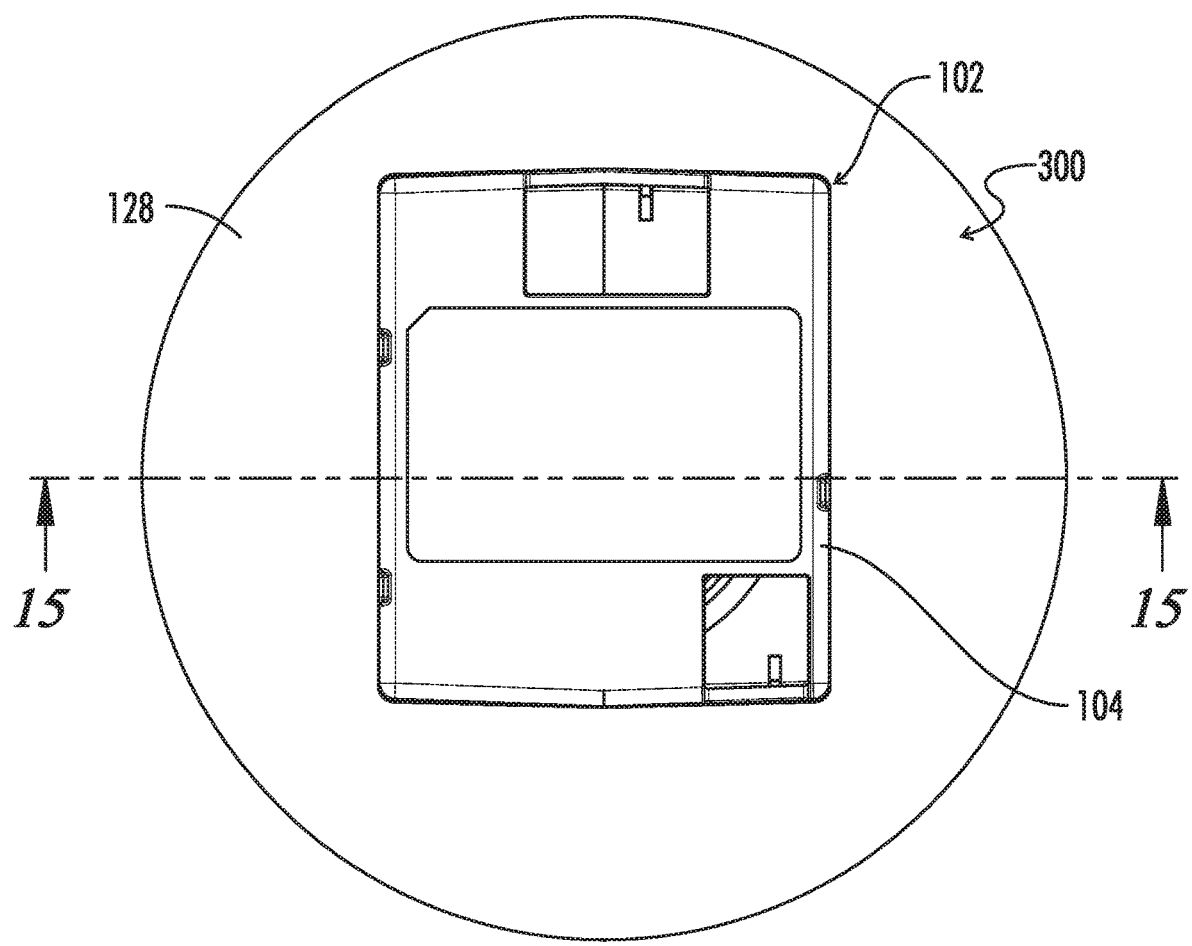
FIG. 14 is a top plan view of the sealed sensor apparatus of FIG. 12 installed in a corresponding hole of the mounting plate.
Figure 15:
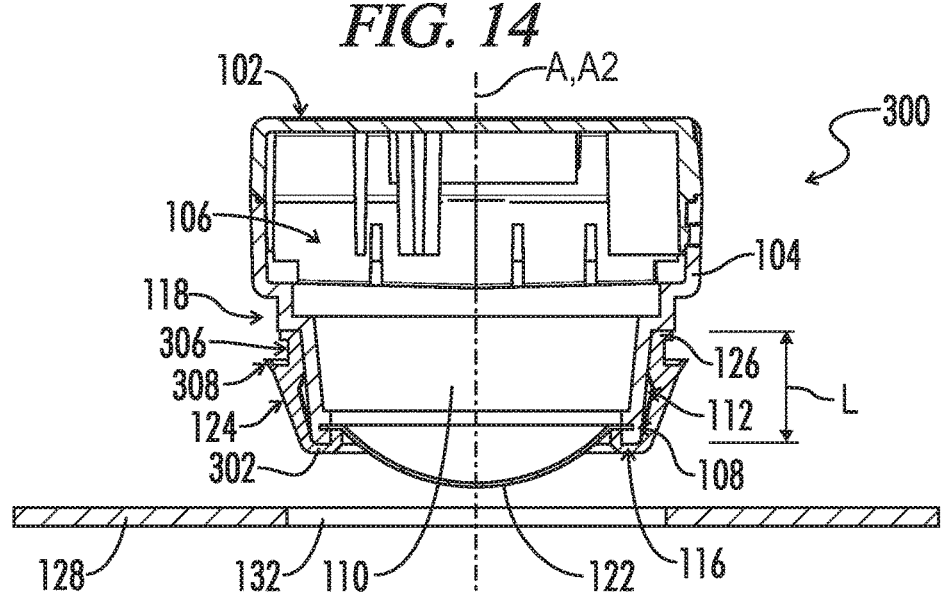
FIG. 15 is a side elevation cross-sectional view of the sealed sensor apparatus of FIG. 12 exploded from the mounting plate.
Figure 16:
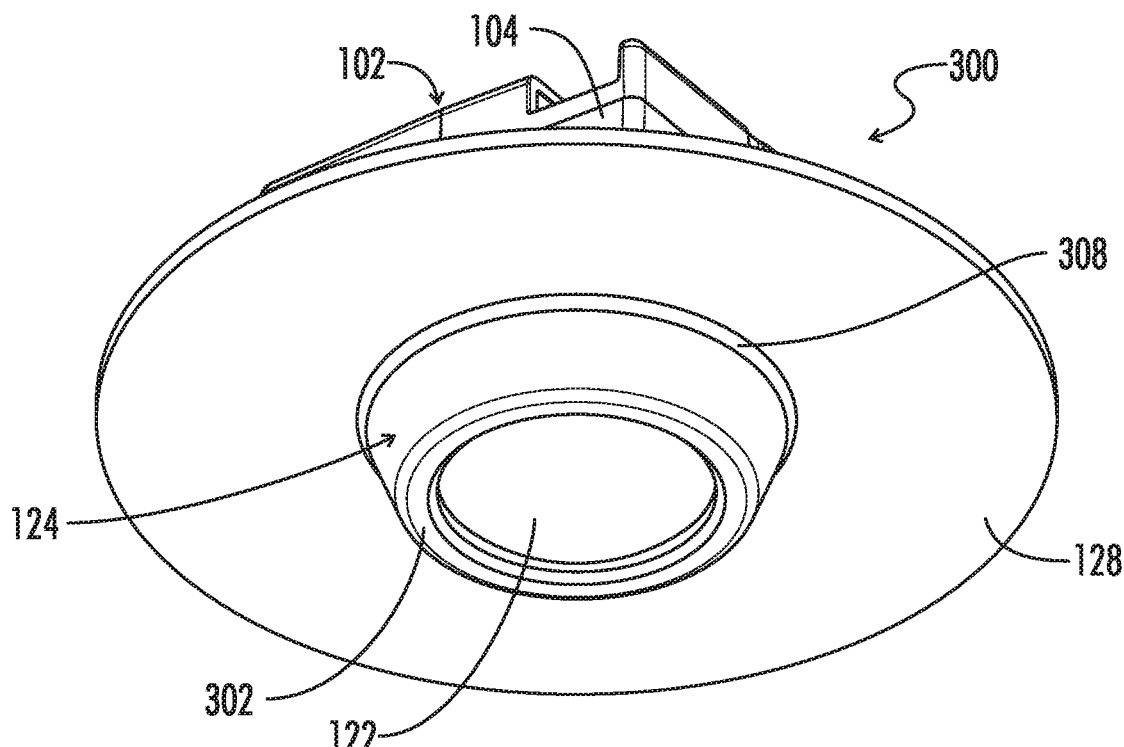
FIG. 16 is a bottom isometric view of the sealed sensor apparatus of FIG. 12 installed in a corresponding hole of the mounting plate.
Figure 17:
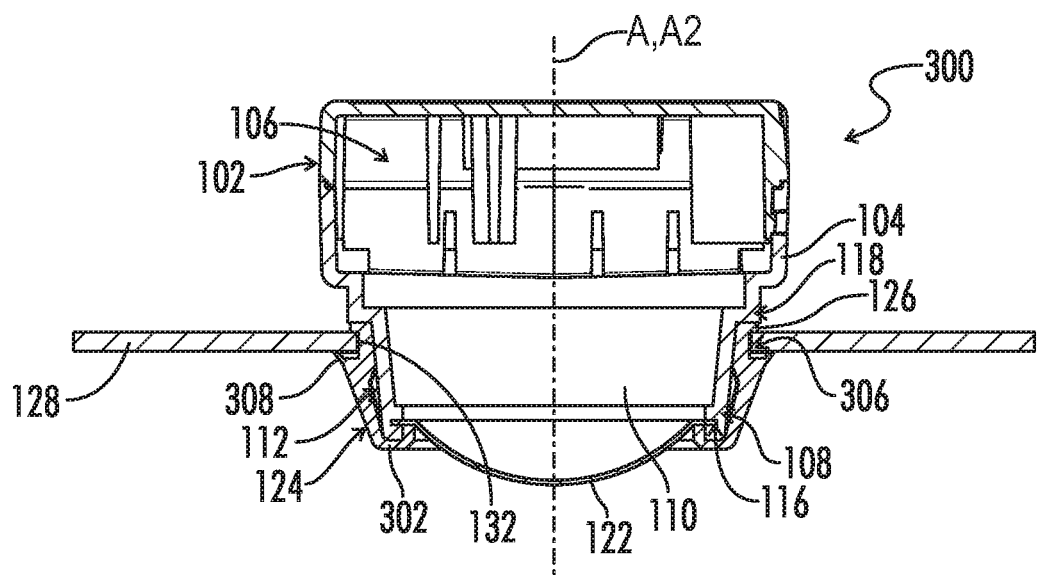
FIG. 17 is a side elevation cross-sectional view of the sealed sensor apparatus of FIG. 12 installed in the hole of the mounting plate.
Figure 18:
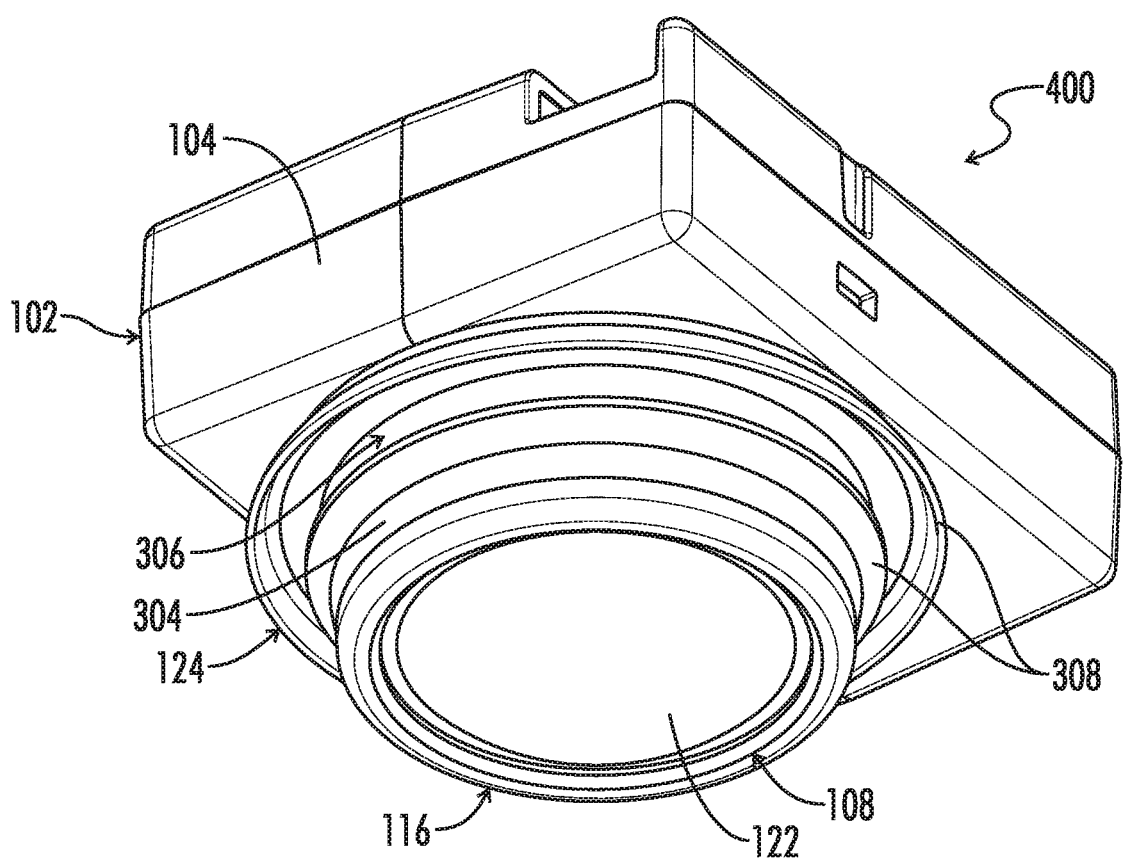
FIG. 18 is a bottom isometric view of still another embodiment of a sealed sensor apparatus.
Figure 19:
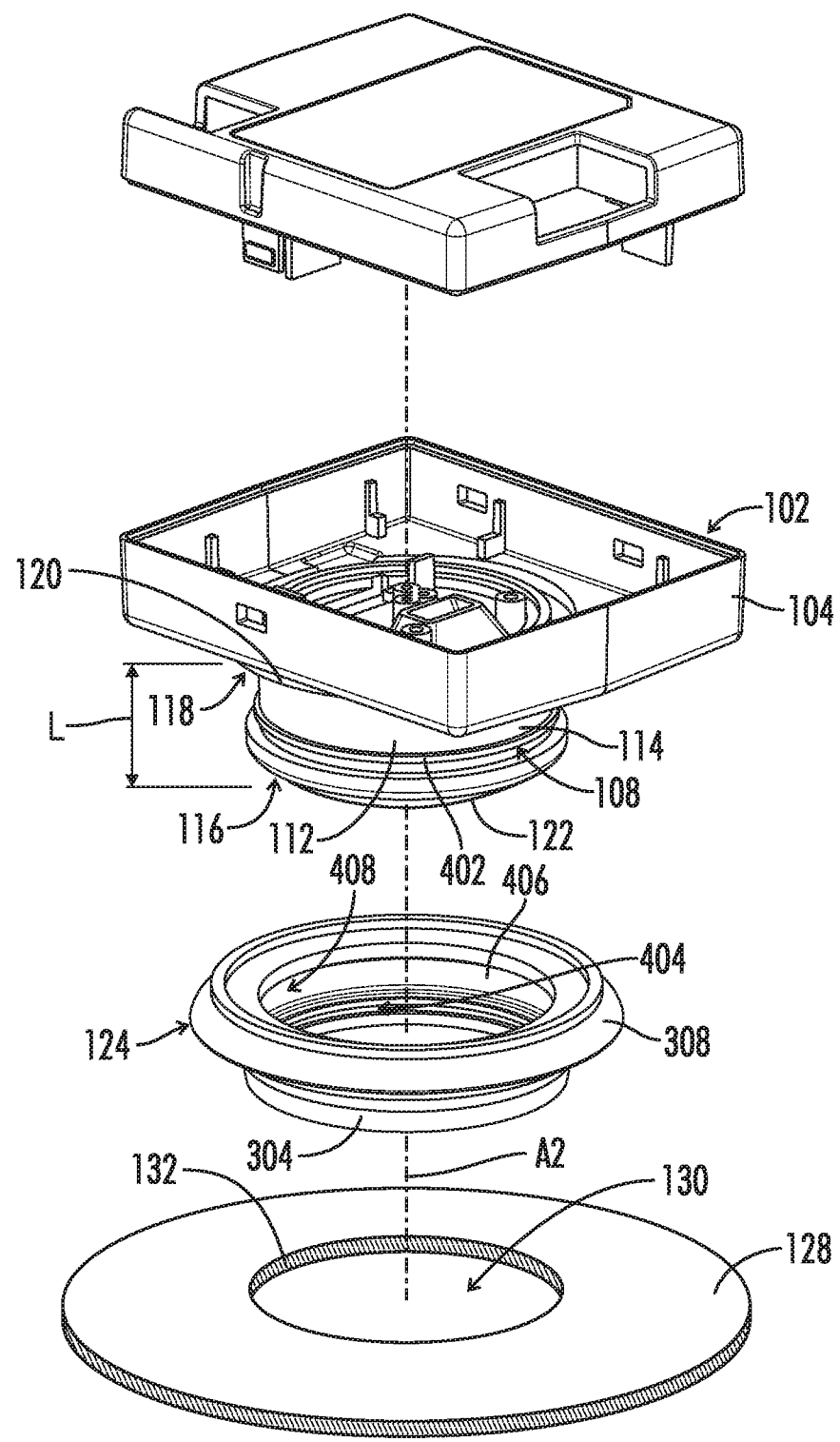
FIG. 19 is a top isometric view of the sealed sensor apparatus of FIG. 18 exploded from a corresponding mounting plate.
Figure 20:
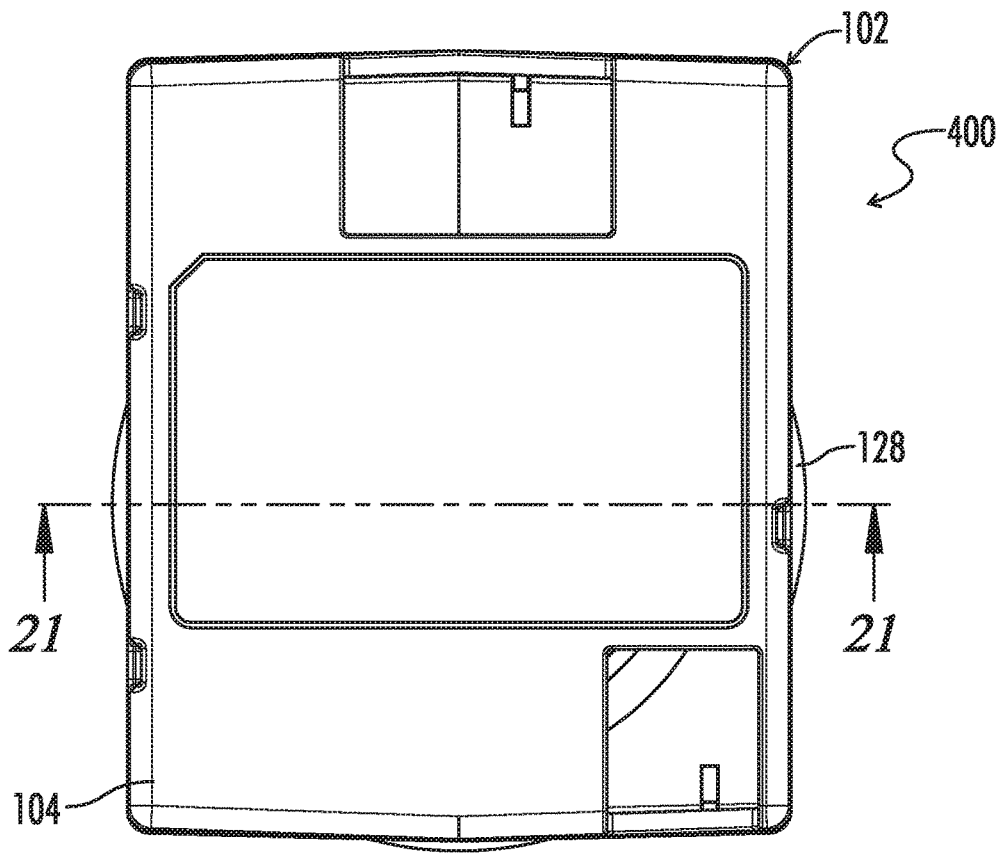
FIG. 20 is a top plan view of the sealed sensor apparatus of FIG. 18 installed in a corresponding hole of the mounting plate.
Figure 21:
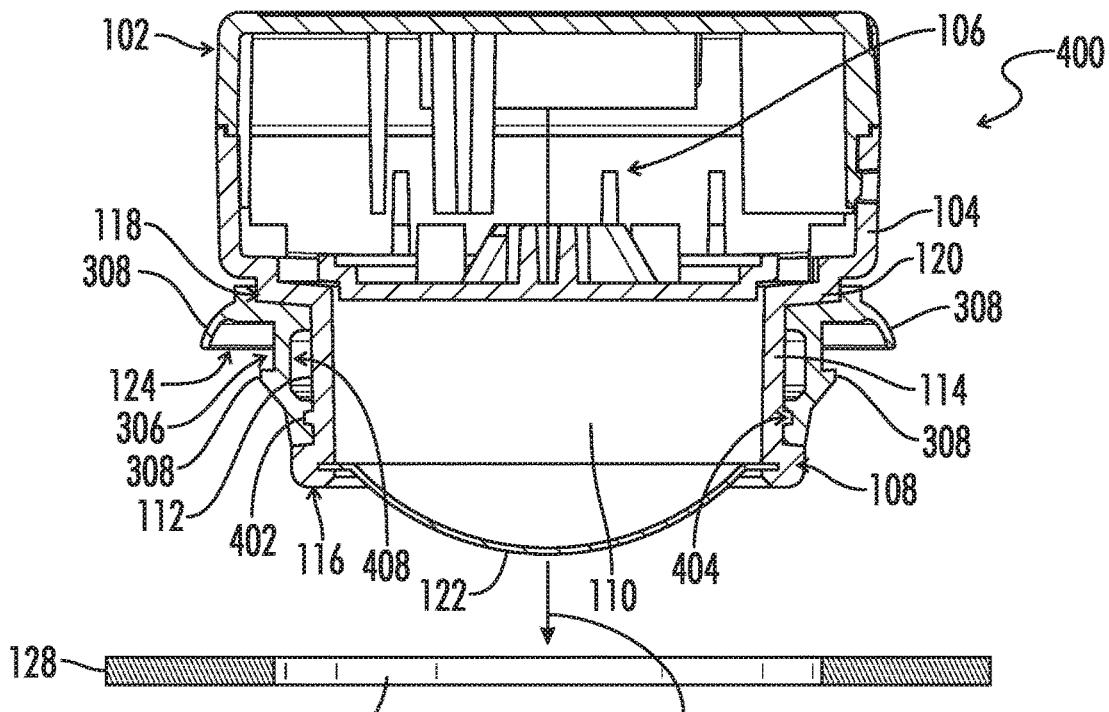
FIG. 21 is a side elevation cross-sectional view of the sealed sensor apparatus of FIG. 18 exploded from the mounting plate.
Figure 22:
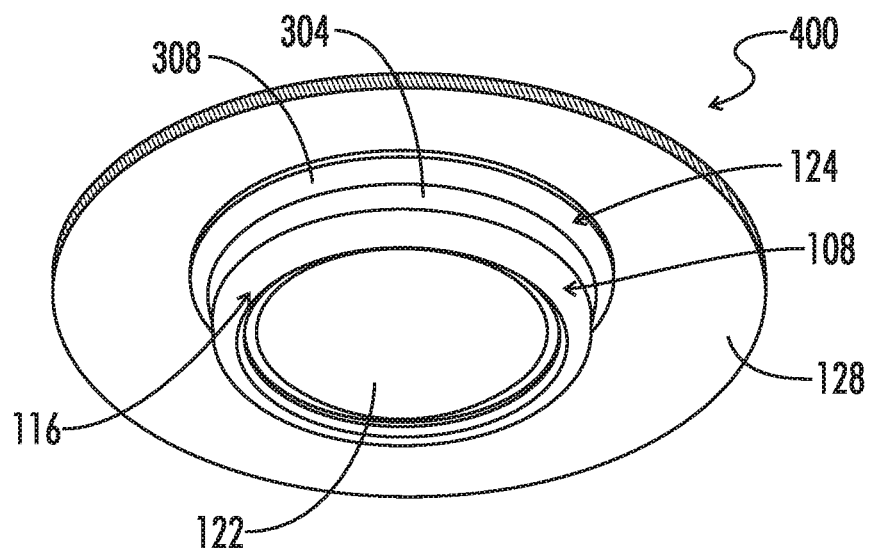
FIG. 22 is a bottom isometric view of the sealed sensor apparatus of FIG. 18 installed in a corresponding hole of the mounting plate.
Figure 23:
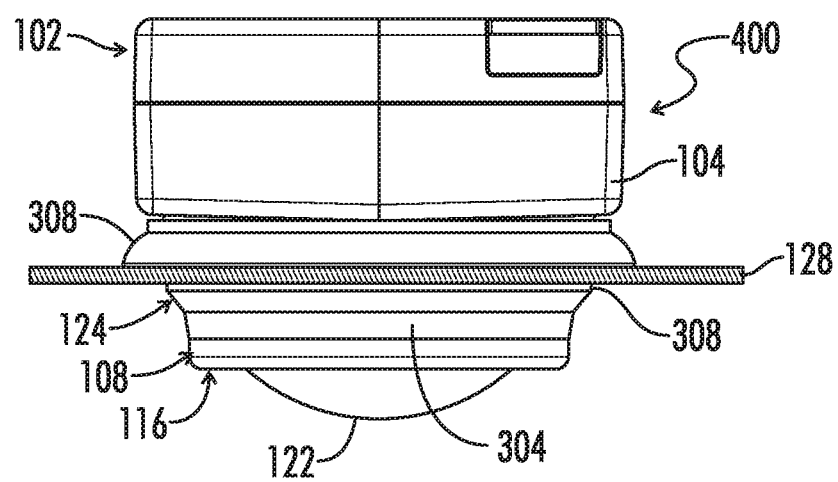
FIG. 23 is a side elevation cross-sectional view of the sealed sensor apparatus of FIG. 18 installed in the hole of the mounting plate.

Once the first mounting protrusion 204 is passed through the mounting hole 130 as shown in FIG. 9, the sealed sensor apparatus 200 may be forced against the hole perimeter surface 132 such that the gasket 124 is compressed. This compression of the gasket 124 may allow enough clearance between the second mounting protrusion 206 and the mounting plate 128 such that the second mounting protrusion may pass through the mounting hole 130. Once both mounting protrusions 202 have passed the mounting hole, the force (by a user) on the sealed sensor apparatus 200 against the hole perimeter surface 132 adjacent the first mounting protrusion 204 may be released. The sealed sensor apparatus 200 may then maintain a water-tight seal between the mounting plate and the housing 102.

Turning now to FIGS. 12-17, a third embodiment of a sealed sensor apparatus 300 is shown. Many portions of the sealed sensor apparatus 300 may be similar to those discussed above, and the corresponding drawing figures may include repeated reference characters previously listed. In the interest of brevity, duplicative description of these above stated features/components/portions have been omitted.

In the sealed sensor apparatus 300, the gasket 124 may have a radially inward projection (or inwardly projecting gasket lens end) 302 such that the inward projection is adjacent the distal end 116 of the cylindrical extension 108. The gasket 124 may contact both the exterior surface 112 and the interior surface 110 of the cylindrical extension 108 in such a configuration. The gasket 124 may additionally or alternatively engage the lens end 116 of the cylindrical wall 114 in such a configuration. The gasket 124 may further include a radially outer surface 304 including a mounting groove 306 defined therein. The gasket 124 may also have an outwardly projecting sealing rib 308 spaced from the outwardly projecting gasket shoulder 126. The sealing rib 308 and the gasket shoulder 126 may define the mounting groove 306 therebetween. The outwardly projecting sealing rib 308 may be spaced from the outwardly projecting gasket shoulder 126 such that the sealing rib and gasket shoulder capture the mounting plate 128 therebetween when the sealed sensor apparatus 300 is installed on the mounting plate.

Turning now to FIGS. 18-23, another embodiment of a sealed sensor apparatus 400 is shown. Many portions of the sealed sensor apparatus 400 may be similar to those discussed above, and the corresponding Figures may include repeated reference characters previously listed. In the interest of brevity, duplicative description of these above stated features/components/portions have been omitted.

In the sealed sensor apparatus 400, the cylindrical extension 108 may further include at least one annular projection 402 extending radially outward from the extension axis A. The gasket 124 may have a corresponding inner groove 404 configured to receive the annular projection 402 when fitted on the cylindrical extension 108. The gasket 124 may also include a radially inner surface 406. The radially inner surface 406 may have an indentation 408 configured to provide a space between the gasket 124 and the cylindrical extension 108 when the gasket is mounted on the cylindrical extension.

All embodiments of the current disclosure may be used with any appropriate sensor. Contemplated sensors may include, in non-limiting embodiments, active infrared (AIR) sensors, passive infrared (PIR) sensors, microwave (MW) sensors, area reflective type sensors, ultrasonic sensors, vibration sensors, video motion sensors, tomographic motion sensors, any combination thereof, and the like.

This written description uses examples to disclose the invention and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although embodiments of the invention have been described using specific terms, such description is for illustrative purposes only. The words used are words of description rather than limitation. It is to be understood that changes and variations may be made by those of ordinary skill in the art without departing from the spirit or the scope of the present invention, which is set forth in the following claims. In addition, it should be understood that aspects of the various embodiments may be interchanged in whole or in part. While specific uses for the subject matter of the invention have been exemplified, other uses are contemplated. Therefore, the spirit and scope of the appended claims should not be limited to the description of the versions contained herein.

What is claimed is:

1. A sealed sensor apparatus comprising:
   a housing including
   a base portion configured to house circuitry of the sensor apparatus, and
   an integral cylindrical extension projecting from the base portion, the cylindrical extension including an interior surface defining an interior cavity and an exterior surface radially spaced from the interior surface;
   a gasket received around the exterior surface of the cylindrical extension, wherein the gasket includes a radially inward projection adjacent a distal end of the cylindrical extension such that the gasket contacts both the exterior surface and the interior surface of the cylindrical extension; a lens sealingly mounted to the cylindrical extension; wherein the gasket further includes an outer gasket surface including a mounting groove defined therein; and wherein the gasket further comprises an outwardly projecting sealing rib spaced from an outwardly projecting gasket shoulder, the sealing rib and gasket shoulder defining the mounting groove therebetween.

2. The sealed sensor apparatus of claim 1, wherein the lens is overmolded in the cylindrical extension.

3. A sealed sensor apparatus comprising:
   a housing including
      a base portion configured to house circuitry of the sensor apparatus, and
      an integral cylindrical wall projecting from the base portion, the cylindrical wall including a central axis and a cylinder length defined along the central axis; and
   a gasket disposed on the cylindrical wall and coextensive with a majority of the cylinder length, wherein the gasket further includes:
      an outwardly projecting gasket shoulder, and
      an outwardly projecting sealing rib spaced from the outwardly projecting gasket shoulder, the sealing rib and gasket shoulder defining a mounting groove therebetween.

4. The sealed sensor apparatus of claim 3, wherein the gasket further comprises an inwardly projecting gasket lens end engaging the lens end of the cylindrical wall.

5. The sealed sensor apparatus of claim 3, further comprising diametrically opposed mounting protrusions disposed on the cylindrical wall nearer the lens end than the base end.

6. A sealed sensor apparatus comprising:
   a mounting plate;
   a mounting hole defined in the mounting plate by a hole perimeter surface of the mounting plate, the hole perimeter surface parallel to an axis of the mounting hole;
   a housing including a base portion and an integral cylindrical portion extending therefrom, the cylindrical portion inserted in the mounting hole; and
   a gasket disposed between the cylindrical portion and the hole perimeter surface, wherein the gasket includes:
      an outwardly projecting gasket shoulder, and
      an outwardly projecting sealing rib spaced from the outwardly projecting gasket shoulder, the outwardly projecting sealing rib and outwardly projecting gasket shoulder capturing the mounting plate therebetween.

7. The sealed sensor apparatus of claim 6, wherein the cylindrical portion and the mounting hole are sized such that the gasket forms a water-tight seal between the cylindrical portion and the hole perimeter surface.

8. The sealed sensor apparatus of claim 6, wherein the gasket is further disposed between the housing and the mounting plate such that the cylindrical portion and the gasket plug the mounting hole.

9. The sealed sensor apparatus of claim 6, further comprising:
   a lens mounted to the cylindrical portion, the lens extending in a direction away from the base portion beyond the mounting plate.

10. The sealed sensor apparatus of claim 9, wherein the lens is sealingly mounted to the cylindrical portion.

\* \* \* \* \*